United States Patent
Hacault

(10) Patent No.: US 10,472,041 B2
(45) Date of Patent: Nov. 12, 2019

(54) SYSTEM AND METHOD FOR FLAG DOOR OPERATION

(71) Applicant: The Boeing Company, Chicago, IL (US)

(72) Inventor: James Paul Hacault, Winnipeg (CA)

(73) Assignee: The Boeing Company, Chicago, IL (US)

( * ) Notice: Subject to any disclaimer, the term of this patent is extended or adjusted under 35 U.S.C. 154(b) by 497 days.

(21) Appl. No.: 15/364,360

(22) Filed: Nov. 30, 2016

(65) Prior Publication Data
US 2018/0148156 A1    May 31, 2018

(51) Int. Cl.
*B64C 1/14*    (2006.01)

(52) U.S. Cl.
CPC .................................. *B64C 1/1407* (2013.01)

(58) Field of Classification Search
CPC ...................... B64C 1/1407; B64C 2001/009
See application file for complete search history.

(56) References Cited

U.S. PATENT DOCUMENTS

| 4,720,065 | A | * | 1/1988 | Hamatani | B64C 1/1407 244/129.5 |
|---|---|---|---|---|---|
| 5,031,863 | A | * | 7/1991 | Noble | B64C 1/1407 244/129.5 |
| 5,064,147 | A | * | 11/1991 | Noble | B64C 1/1407 244/129.5 |
| 5,305,969 | A | * | 4/1994 | Odell | B64C 1/1407 244/129.5 |
| 5,337,977 | A | * | 8/1994 | Fleming | B64C 1/1407 244/129.5 |
| 8,734,211 | B2 | | 5/2014 | Tuchimaa et al. | |

* cited by examiner

*Primary Examiner* — Rodney A Bonnette
(74) *Attorney, Agent, or Firm* — Toler Law Group, PC

(57) ABSTRACT

An aircraft includes a first structure between a pressure-controlled region of the aircraft and a non-pressure-controlled region of the aircraft and a second structure between the non-pressure-controlled region and an exterior of the aircraft. The aircraft also includes a first door assembly that includes a first door configured to cover a first opening between the pressure-controlled region and the non-pressure-controlled region and a second door configured to cover a second opening between the non-pressure-controlled region and the exterior. The aircraft further includes a spring coupled, via a first member, to the first door assembly and coupled, via a mechanical linkage, to the second door. The spring is configured to apply a first force to the first member and to apply a second force, via the mechanical linkage, to the second door, where the second force is applied based on a state of the first door assembly.

20 Claims, 12 Drawing Sheets

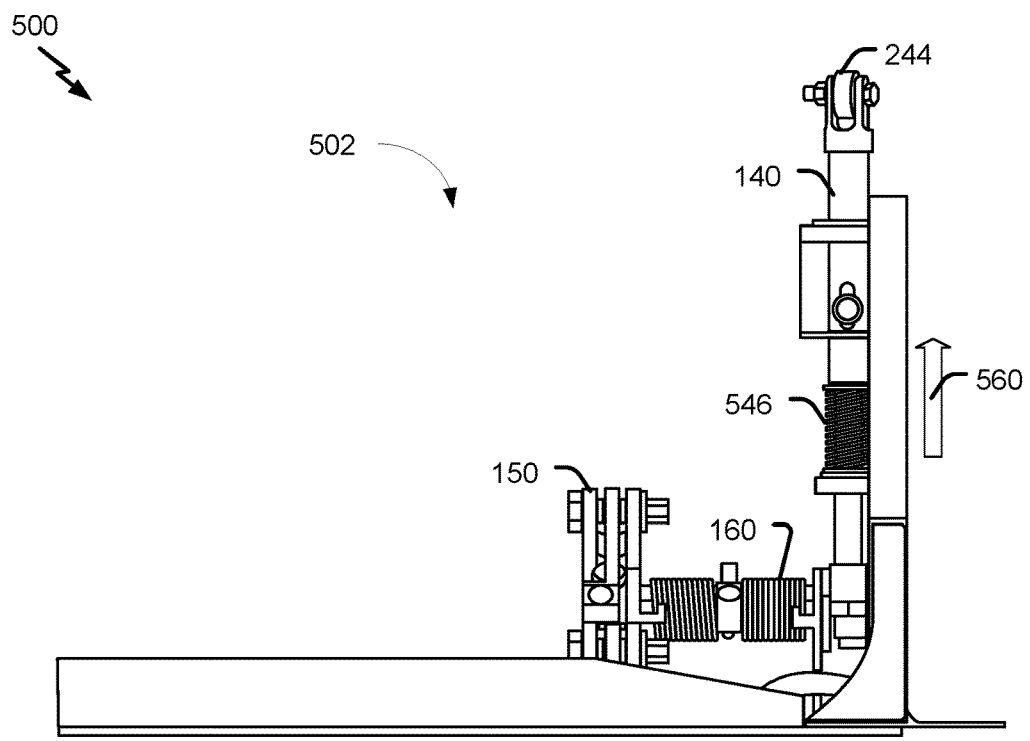
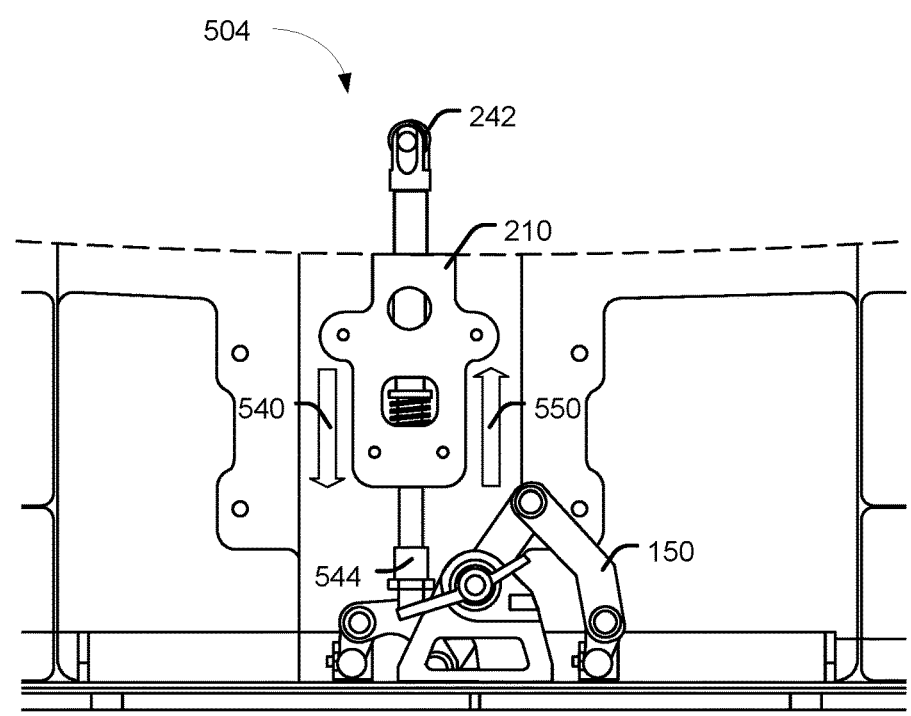
FIG. 5

SYSTEM AND METHOD FOR FLAG DOOR OPERATION

FIELD OF THE DISCLOSURE

The present disclosure is generally related to flag doors.

BACKGROUND

Aircraft include systems that are configured to release pressure in response to pressurization or over-pressurization of a portion of the aircraft caused by an incomplete latching of an access door (e.g., a first door) to the portion of the aircraft. Conventional systems utilize a pressure relief valve, a vent, or a door (e.g., a second door) that is configured to open based on a pressure difference between a pressure (e.g., an interior pressure) of the portion and an exterior pressure or an ambient pressure and to release the pressure (e.g., balance the pressure difference).

Additionally, in some conventional systems the second door may be configured to also open based on a latch position of the access door to provide a visual cue that the access door is not fully latched. In such systems, the second door may be referred to as a "flag door." To illustrate, a latch or handle of the access door is coupled to a pushrod. The pushrod drives a rotatable arm that is biased by a torsion spring. When the access door is not fully latched (e.g., unlatched or partially latched), the latch or handle allows the pushrod to move and the torsion spring can rotate (e.g., overcome the force of the pushrod and the latch or handle). The torsion spring rotates the rotatable arm and a lever hook attached to the rotatable arm. Rotating the lever hook releases a latch pin that holds the second door closed. The second door is coupled to a set of second torsion springs which open the second door when the latch pin is free.

SUMMARY

In a particular implementation, an aircraft includes a first structure between a pressure-controlled region of the aircraft and a non-pressure-controlled region of the aircraft and a second structure between the non-pressure-controlled region and an exterior of the aircraft. The aircraft also includes a first door assembly that includes a first door configured to cover a first opening between the pressure-controlled region and the non-pressure-controlled region and a second door configured to cover a second opening between the non-pressure-controlled region and the exterior. The aircraft further includes a spring coupled, via a first member, to the first door assembly and coupled, via a mechanical linkage, to the second door. The spring is configured to apply a first force to the first member and to apply a second force, via the mechanical linkage, to the second door, where the second force is applied based on a state of the first door assembly.

In another particular implementation, a device includes a spring configured to bias a door in an open position. The device also includes a mechanical linkage coupled to the spring, the door, and to a first member, where the spring is configured to drive the mechanical linkage to open the door responsive to a position of the first member.

In another particular implementation, a method of operating a flag door includes responsive to a first door being in a first state, opening a second door, where a spring provides a first force to drive a mechanical linkage to open the second door. The method also includes responsive to the first door being in a second state, closing the second door, where a first member coupled to the first door and the mechanical linkage exerts a second force to close the second door based on the first door being in the second state.

BRIEF DESCRIPTION OF THE DRAWINGS

FIG. 5 is a diagram that illustrates a side view and a front view of the example of the system for operating a flag door;

DETAILED DESCRIPTION

Figure 1:
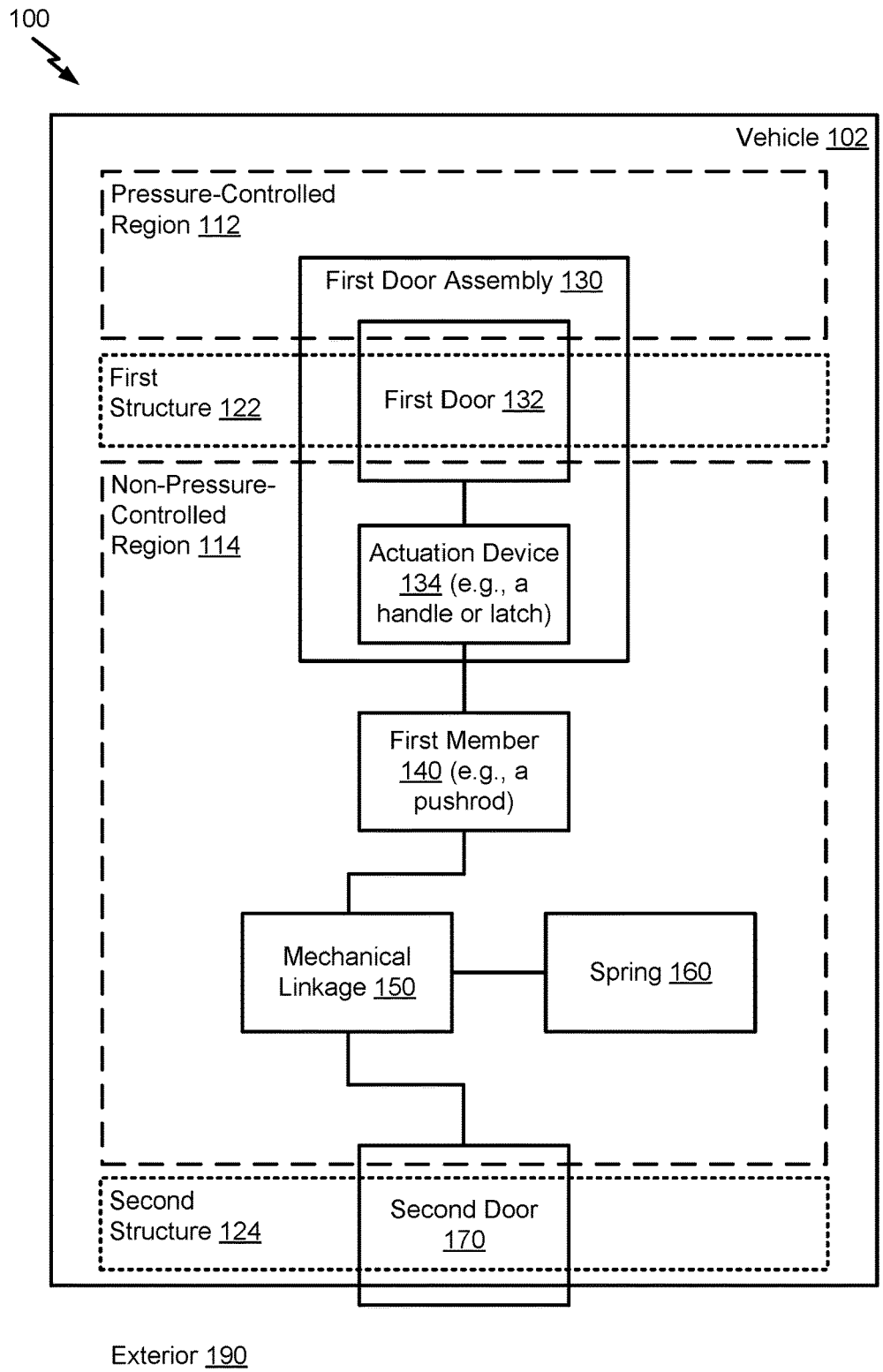
FIG. 1 is a block diagram that illustrates an example of a system for operating a flag door.

Implementations disclosed herein are directed to systems for operating flag doors. The system for operating flag doors may be included on a vehicle, such as an aircraft. An exemplary system for operating flag doors includes a first door and a second door. The first door covers an opening between a pressure-controlled region of the system and a non-pressure-controlled region of the system. The second door (e.g., a flag door) covers an opening between the non-pressure-controlled region and an exterior of the system, such as ambient or environmental conditions. An actuation device (e.g., a handle or a latch) of the first door is coupled to the second door via a first member (e.g., a pushrod) and a mechanical linkage. The mechanical linkage includes a rotatable arm coupled to the first member. A spring may be disposed around the rotatable arm and configured to rotate the rotatable arm. In a particular implementation, the mechanical linkage includes an input linkage, a coupler linkage, and an output linkage. The input linkage is coupled to the rotatable arm, the output linkage is coupled to the second door, and the coupler linkage is coupled to the input linkage and the output linkage. Rotation of the rotatable arm drives the mechanical linkage to open the second door. The input linkage, the coupler linkage, the output linkage, and ground (e.g., a frame of the system) may correspond to a four-bar linkage. In other implementations, other linkages may be used to open the second door. The second door provides a visual cue that the first door is unlatched or partially latched. Additionally, the second door is configured to open in response to a pressure differential (e.g., a pressure difference) between a pressure of the non-pressure-controlled region and an exterior pressure or an ambient pressure and to release the pressure (e.g., balance the pressure differential) of the non-pressure-controlled region. In some implementations, the system includes a third door (e.g., another flag door). The third door may be adjacent to the second door and rotation of the rotatable arm may drive a second four-bar linkage to open the third door.

As a particular non-limiting example, the system is included on an aircraft, and the non-pressure-controlled region corresponds to a cavity of a faring (e.g., a wing-to-body fairing) of the aircraft and the first door corresponds to an access hatch of an equipment bay of the aircraft.

By utilizing a more direct or driven linkage, the system is less complex and uses fewer parts than systems which use triggered torsion spring to open flag doors of a flag door system. For example, the system does not use a latch release and a latch re-arming mechanism. By being less complex and using fewer parts, the system has reduced costs and reduced maintenance as compared to triggered torsion spring systems.

As compared to pressure differential based systems, a system with a flag door provides a visual cue or indication of an incomplete latch of the first door (e.g., the access door) to crew. As compared to a two-door system with a shared linkage, the system is configured to open the second door based on a pressure differential in addition to opening based on the state of the first door.

FIG. 1 illustrates an example of a system 100 for operating a flag door. The system 100 enables venting of pressure from a non-pressure-controlled region 114 (e.g., a non-pressurized region) and provides a visual cue that a door, such as an access door is unlatched. As illustrated in FIG. 1, the system 100 is included on a vehicle 102, such as an aircraft 1202 shown in FIG. 12. In other implementations, the system 100 may be included in building, such as an automated factory. The system 100 includes a first door assembly 130, a first member 140, a mechanical linkage 150, a spring 160, and a second door 170. The vehicle 102 includes a pressure-controlled region 112 and the non-pressure-controlled region 114. As illustrative, non-limiting examples, the pressure-controlled region 112 may include a fuselage, a cabin, or a bay of an aircraft. The non-pressure-controlled region 114 may include a cargo hold or a cavity of the aircraft, such as a cavity formed by a wing-to-body fairing and an exterior portion of a fuselage and/or a wing. The pressure-controlled region 112 (or a portion thereof) may be separated from the non-pressure-controlled region 114 by a first structure 122. A second structure 124 (or a portion thereof) of the vehicle 102 may partially define the non-pressure-controlled region 114, may separate the non-pressure-controlled region 114 from an exterior 190, or both. The exterior 190 is external to the system 100 and the vehicle 102. The exterior 190 may correspond to environmental or ambient conditions.

The first door assembly 130 may be included in or may be part of the first structure 122. The first door assembly 130 includes a first door 132 and an actuation device 134. The first door 132 is configured to cover a first opening between the pressure-controlled region 112 and the non-pressure-controlled region 114. The actuation device 134 is coupled to the first door 132 and is configured to open and close the first door 132 and to lock (e.g., latch) and unlock (e.g., unlatch) the first door 132. The actuation device 134 may include or correspond to a handle or a latch of the first door 132 of the first door assembly 130. As an illustrative, non-limiting example, the first door assembly 130 may correspond to a door that provides access to a bay of an aircraft.

The first member 140 is coupled to the first door assembly 130. As illustrated in FIG. 1, the first member 140 is coupled to the actuation device 134 of the first door assembly 130. The first member 140 may include or correspond to a pushrod. The first member 140 is configured to move from a first position to a second position based on a state of the first door 132. To illustrate, when the first door 132 is in a first state (e.g., latched), the actuation device 134 is in the first position (e.g., a latched position) which forces the first member 140 into the first position. When the first door 132 is in a second state (e.g., unlatched or partially latched), a position and/or a shape of the actuation device 134 may enable the first member 140 to move into the second position, as described further with reference to FIG. 3.

The mechanical linkage 150 is coupled to the first door assembly 130 via the first member 140 and the actuation device 134. The mechanical linkage 150 includes one or more members or links which form moveable joints (e.g., rotatable joints). The mechanical linkage 150 is configured to open the second door 170 based on the state of the first door 132. For example, the position of the first member 140 (which is controlled by or dependent on the state of the first door 132) controls operation of the mechanical linkage 150.

The spring 160 is configured to exert a force (or forces) on the mechanical linkage 150 independent of a state of the first door 132 and to drive the mechanical linkage 150 based on a state of the first door 132 (e.g., the position of the actuation device 134, the position of the first member 140, or both). For example, when the first member 140 is in the first position, the spring 160 exerts a force to open the second door 170 but does not drive the mechanical linkage 150 to open the second door 170. To illustrate, the spring 160 exerts a force that is less than a force exerted by the first member 140 when held in the first position by the actuation device 134. When the first member 140 is in the second position, the spring 160 drives the mechanical linkage 150 to open the second door 170. To illustrate, the force exerted by the spring 160 moves the first member 140 from the first position to the second position when the actuation device 134 is in the second position (e.g., unlatched or partially latched). The spring 160 may be configured to provide a bending moment, torque, linear forces, or rotational forces. As an illustrative, non-limiting example, the spring 160 includes a helical torsion spring.

The mechanical linkage 150 and the spring 160 are also configured to open the second door 170 based on a pressure differential and a state of the first door 132. For example, when the first door 132 is in the second state and a pressure differential between a first pressure of the non-controlled-pressure region 114 and a second pressure of the exterior 190 exceeds a pressure threshold, a force caused by the pressure differential will open the second door 170 and move the first member 140 from the first position to the second position when the actuation device 134 is in the second position. In such conditions, the pressure differential will rotate the second door 170 and drive the mechanical linkage 150 to open the second door 170 in the event of a failure of the spring 160 or degradation of the spring 160. Additionally or alternatively, the mechanical linkage 150 and the spring 160 are configured to open the second door 170 based on the pressure differential independent of a state of the first door 132. For example, when a pressure differential between the first pressure of the non-controlled-pressure region 114 and the second pressure of the exterior 190 exceeds the pressure threshold, the force of the spring 160 and the force caused by the pressure differential will overcome the force of the first member 140 when the actuation device 134 is in the first position. In such conditions, the spring 160 and the pressure differential will drive the mechanical linkage 150 to open the second door 170.

The second door 170 is configured to cover a second opening between the non-pressure-controlled region 114 and the exterior 190. The second door 170 is configured to open and close based on the state of first door 132 and to open and close based on a pressure differential. The second door 170 may include or correspond to a pressure vent and may provide a visual cue that the first door 132 is in the second state.

Typically during operation of the vehicle 102, the first door 132 is closed and is in the first state. The first state may correspond to the actuation device 134 being in the first position exerting the first force on the first member 140, the mechanical linkage 150, the spring 160, or a combination thereof. The first force is greater than the second force exerted by the spring 160. The first door 132 may be opened by a user, such as for vehicle maintenance or preparation, prior to or during operation. The first door 132 is opened via activating (e.g., rotating) the actuation device 134 from the first position to the second position. Activating the actuation device 134 from the first position transitions the first door 132 from the first state to the second state. In response to the first door 132 being in the second state (e.g., the actuation device 134 being in the second position), the spring 160 will drive (e.g., rotate) the mechanical linkage 150 to open the second door 170. To illustrate, the first force may be reduced and the second force exerted by the spring 160 may overcome the first force and/or the second position of the actuation device 134 may enable the first member 140 to transition from the first position to the second position of the first member 140. After the vehicle maintenance or preparation is concluded, the first door 132 is generally closed.

In some circumstances, after the vehicle maintenance or preparation is concluded the actuation device 134 may remain in the second position, and the first door 132 will remain in the second state (e.g., unlatched or partially latched) for a period of time and does not transition from the second state to the first state. In such circumstances, the second door 170 will remain open and will not close because the first member 140 will be held in the second position by spring 160 and the rotated mechanical linkage 150. The second door 170 will provide a visual cue to the user or other users that the first door 132 is in the second state (e.g., unlatched or partially latched).

In other circumstances, after the vehicle maintenance or preparation is concluded the actuation device 134 may be reset to the first position and the first door 132 transitions to the first state. The first door 132 may seal the opening in the first structure 122 between the pressure-controlled region 112 and the non-pressure-controlled region 114. In such circumstances, the transition of the actuation device 134 to the first position exerts a force on the first member 140 to transition the first member 140 to the first position. The force exerted on the first member 140, and the first member 140 being disposed in the first position, causes the spring 160 and the mechanical linkage 150 to rotate to close the second door 170.

Additionally, during operation of the vehicle 102, the first door 132 may become unlatched and/or a pressure differential between a first pressure of the non-pressure-controlled region 114 and a second pressure of the exterior 190 may exceed a threshold pressure. In response to either or both of the first door 132 becoming unlatched (or partially latched) or the pressure differential exceeding the threshold pressure, the spring 160 will drive the mechanical linkage 150 to open the second door 170. If the second door 170 is opened responsive to the pressure differential exceeding the threshold pressure, the second door 170 will release or vent pressure from the non-pressure-controlled region 114. As the pressure is released from the non-pressure-controlled region 114, the pressure differential will decrease. In response to the pressure differential being less than or equal to a second threshold pressure, the second door 170 will close. In such implementations, the pressure differential exerts a third force on the second door 170. The third force may open the second door 170 when the actuation device 134 is disposed in the second position. In some implementations, the third force may open the second door 170 when the actuation device 134 is disposed in the first position. For example, a sum of the second force and the third force may be greater than the first force when the pressure differential exceeds the threshold pressure.

The system 100 provides a visual cue or an indication about the state of the first door 132 as compared to conventional pressure regulators and release valves. The visual cue may include the second door 170 being open and protruding from the second structure 124 of the vehicle 102. Additionally, the second door 170 being open may provide change of a color, a texture, a design, or a combination of thereof, visually observable to a person near the vehicle 102. By utilizing a more direct or driven linkage, the system 100 is less complex and uses fewer parts than flag door systems which use triggered (rather than driven) torsion springs to open flag doors. By being less complex and using fewer parts, the system has reduced costs and reduced maintenance as compared to triggered torsion spring flag door systems.

Figure 2:
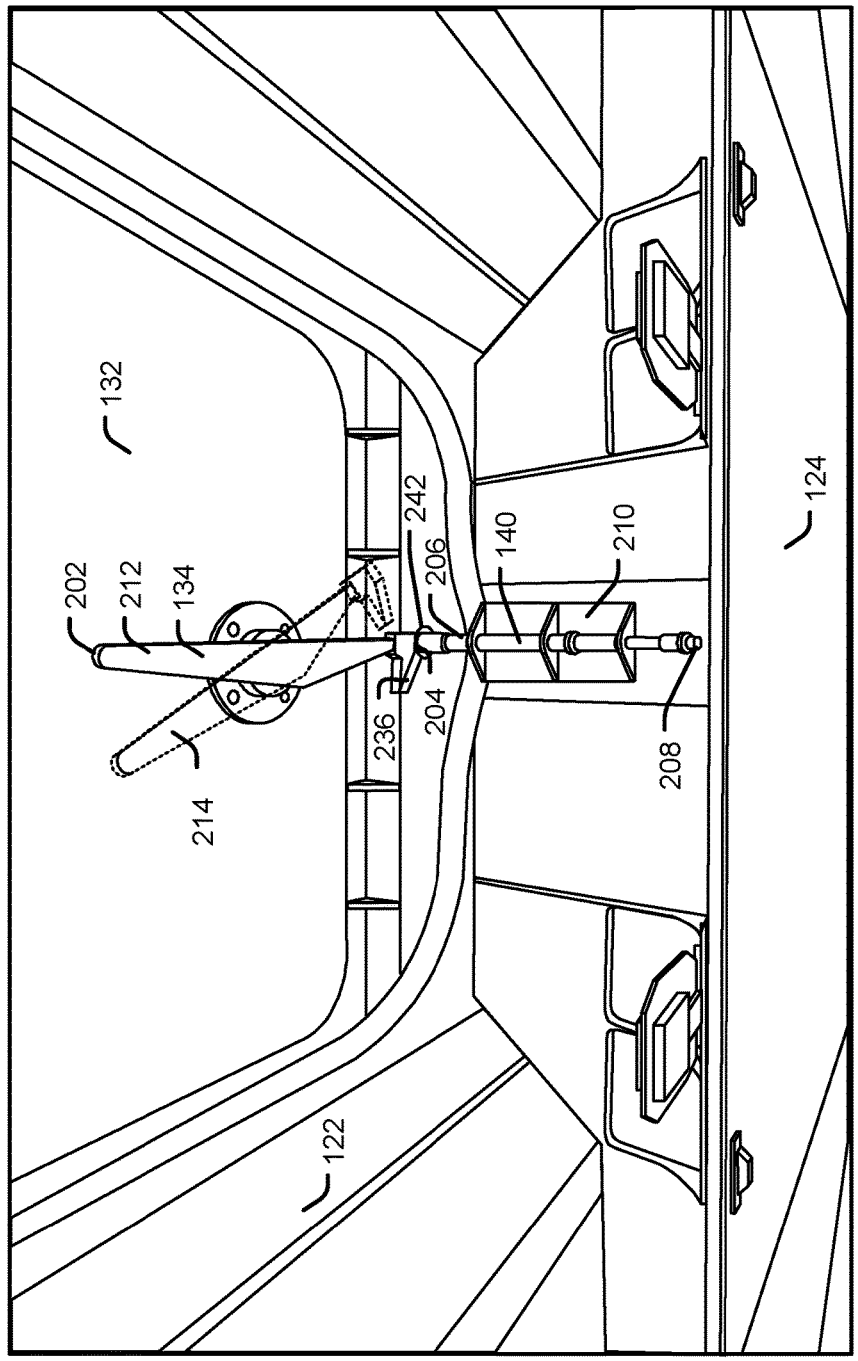
FIG. 2 is a diagram that illustrates an example of a first door assembly of a system for operating a flag door.

FIG. 2 illustrates an example configuration 200 of the system 100 for operating a flag door. In FIG. 2, the mechanical linkage 150, the spring 160, and the second door 170 of the system 100 are not shown for clarity. FIG. 2 depicts the first door assembly 130 and the non-pressure-controlled region 114 (e.g., the cavity). The first door 132 covers the first opening in the first structure 122. The actuation device 134 is coupled to the first door 132. As illustrated in FIG. 2, the actuation device 134 is in the first position 212 (e.g. the latched position). To transition the actuation device 134 to the second position 214 (e.g. the un-latched position) represented by dashed lines, a first end 202 of the actuation device 134 is rotated counter-clockwise as illustrated in FIG. 2.

The actuation device 134 includes the first end 202 and a second end 204. The first member 140 includes a first end 206 and a second end 208. The second end 204 of the actuation device 134 includes an angled portion 236 and the angled portion 236 is in contact with a rotatable member 242 (e.g., a roller, a wheel, or a bearing) of the first end 206 of the first member 140. The second end 208 of the first member 140 is coupled to or in contact with the mechanical linkage 150 (not shown). The first member 140 is coupled to the first structure 122, the second structure 124, or another structure of the vehicle via a bracket 210. As illustrated in FIG. 2, the first member 140 is in the first position. If the actuation device 134 is not in the first position 212, the first member 140 may transition from the first position to the second position. The spring 160 and mechanical linkage 150 may force or bias the first member 140 towards the second position (e.g., upwards as illustrated in FIG. 2). The rotatable member 242 and the angled portion 236 of the actuation device 134 may allow the first member 140 to travel to the second position and may bias the actuation device 134 further towards the second position by the rotatable member 242 rolling along the angled portion 236 of the actuation device 134.

Figure 3:
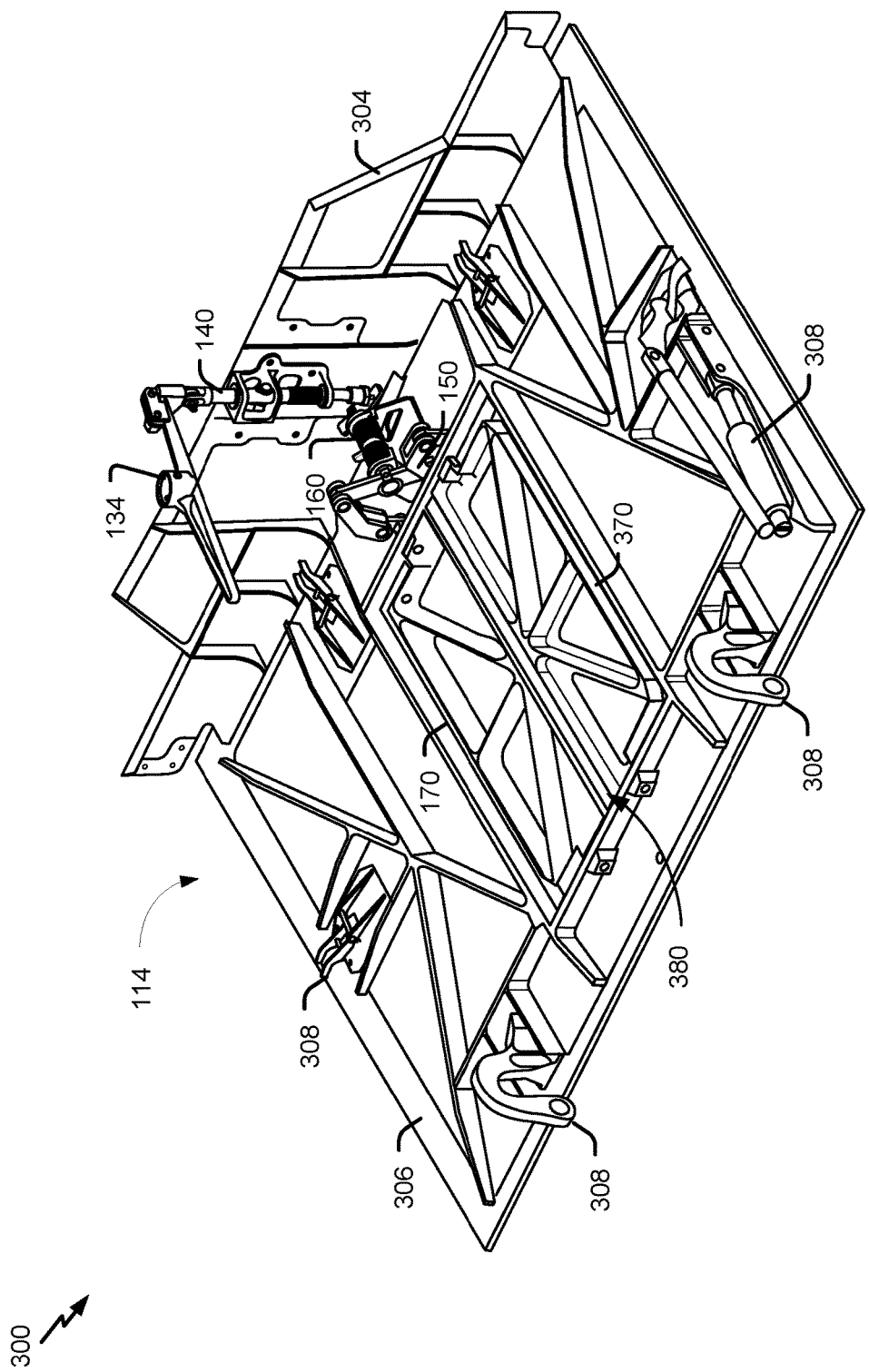
FIG. 3 is a diagram that illustrates an isometric view of an example of a system for operating a flag door.

FIG. 3 is a diagram that illustrates an isometric view 300 of an example of the system 100 for operating a flag door. As illustrated in FIG. 3, the system 100 includes flag doors 380 and the non-pressure-controlled region 114. The flag doors 380 include the second door 170 and a third door 370. The non-pressure-controlled region 114 may correspond to a cavity formed by a wing-to-body fairing of the aircraft and a wing and/or fuselage of the aircraft. The first door assembly 130 and the first door 132 are not shown for clarity.

The aircraft includes a first frame 304 and a second frame 306. The first frame 304 may correspond to a frame of one or more wings, the fuselage, or a combination thereof, of the aircraft. The second frame 306 may correspond to a fairing of the aircraft. The first frame 304 and the second frame 306 are coupled together via one or more attachment mechanisms 308. Additionally or alternatively, the first frame 304 and the second frame 306 may be joined together by fasteners (e.g., screws, bolts, rivets, etc.) and/or processes (e.g., welding). The first frame 304 may include or correspond to the first structure 122 of FIG. 1, and the second frame 306 may include or correspond to the second structure 124 of FIG. 1.

Figure 4:
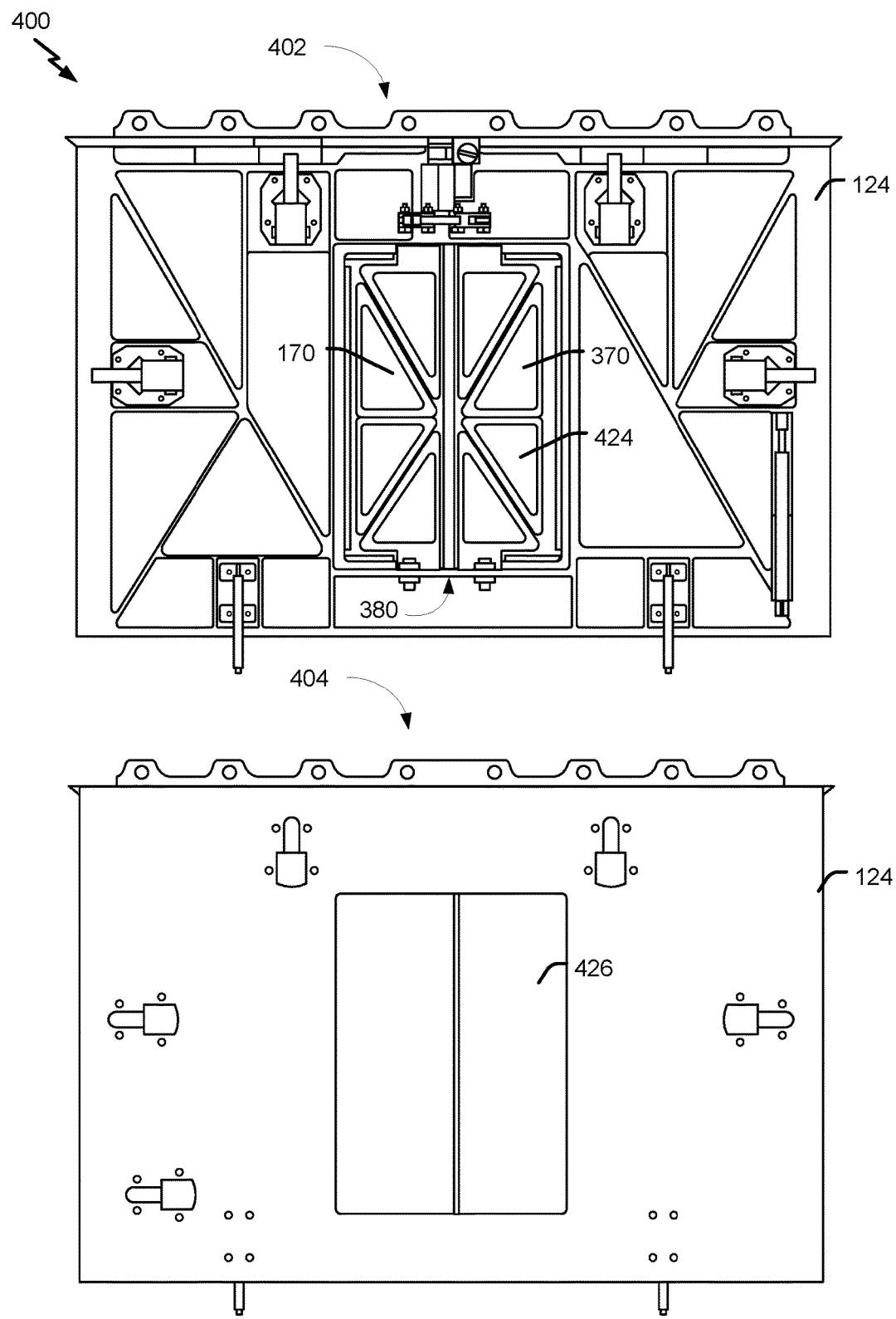
FIG. 4 is a diagram that illustrates a top view and a bottom view of the example of the system for operating a flag door.
Figure 6:
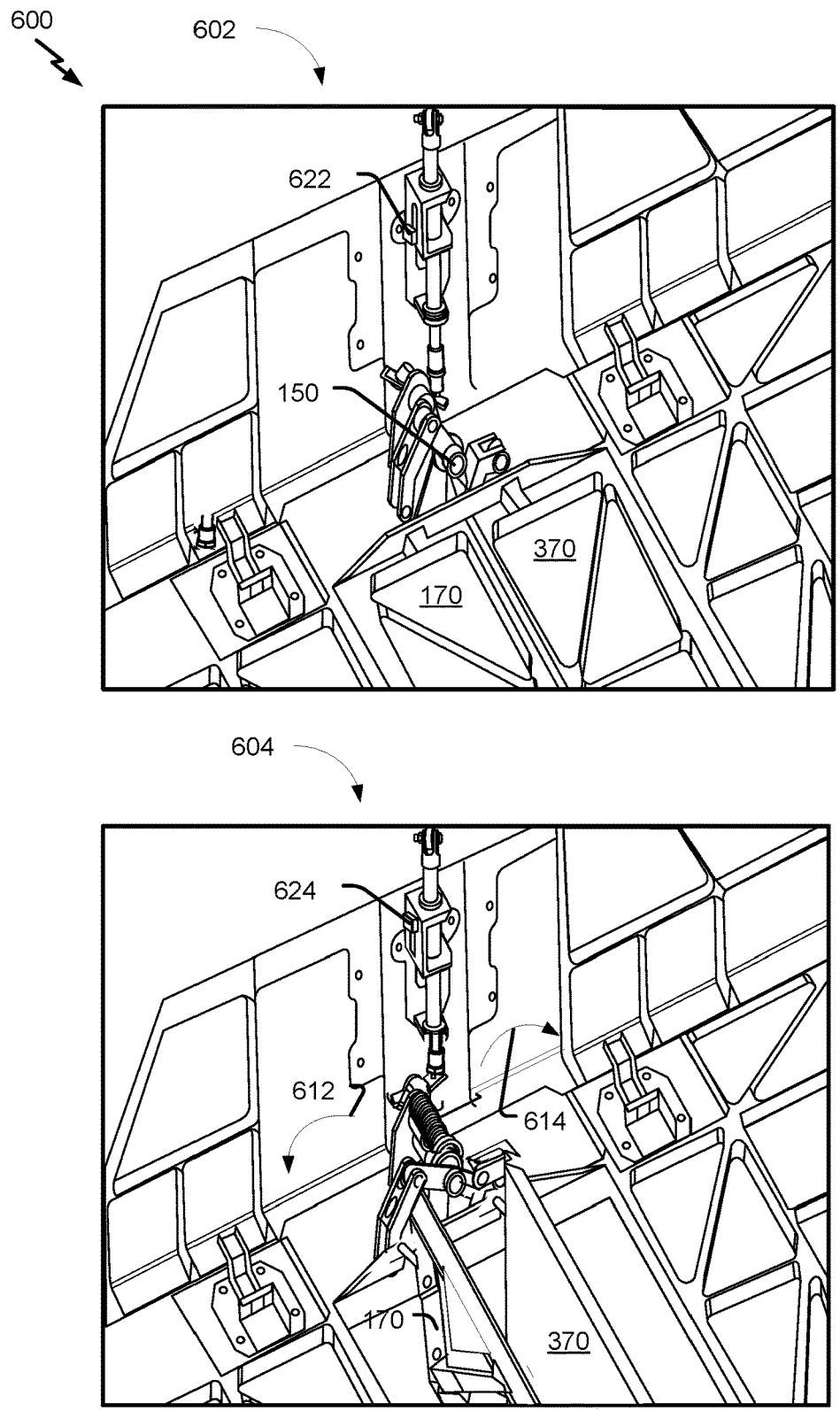
FIG. 6 is a diagram that illustrates isometric views of the example of system for operating a flag door in a closed state and in an open state.

FIGS. 4 and 5 illustrate other views of the example of the system 100. FIG. 6 illustrates operation of the flag doors of the system 100. FIGS. 7-10 illustrate detailed views of components of the system 100.

FIG. 4 is a diagram 400 that illustrates a top view 402 and a bottom view 404 of the example of the system 100 for operating a flag door. The first door assembly 130 is not shown for clarity. As illustrated in FIG. 4, the flag doors 380 include a first side 424 (e.g., an interior side) and a second side 426 (e.g., an exterior side) opposite the first side 424. The flag doors 380 provide a visual indication that the first door 132 is in the second state. To illustrate, the flag doors 380 rotate to open responsive to the first door 132 being in the second state. One or more of the flag doors 380 may utilize colors, patterns textures, finishes, or a combination thereof, to provide or enhance the visual indication. For example, the second side 426 of the flag doors 380 may be a different color from a surrounding area of the second frame 306. As another example, the second door 170 may have a first color different from a second color of the third door 370. As yet another example, the first side 424 of the flag doors 380 may have the first color and the second side 426 of the flag doors may have the second color. Additionally or alternatively, the flag doors 380 may have different patterns, textures, or finishes (e.g., glossy or matte) from each other or the surrounding areas of the second frame 306. Thus, when either of the flag doors 380 (e.g., the doors 170, 370 is at least partially open, a person (e.g., a technician) will be able to visually observe the colors, patterns, textures, etc. that are installed on an interior of the flag doors 380 which are not observable when the flag doors 380 are in the closed position.

FIG. 5 is a diagram 500 that illustrates a side view 502 and a front view 504 of the example of the system 100 for operating a flag door. The first door assembly 130 and the second door 170 are not shown for clarity. Referring to the side view 502, the first member 140 is in the first position. The first member 140 may include a spring 546 coupled to (e.g., disposed around) the first member and configured to bias the first member 140 towards the second position (e.g., upwards as illustrated in the side view 502). The spring 546 may be held in place (e.g., retained) by the bracket 210 and/or one or more spring retainers. The spring 546 may include or correspond to a tension spring or a compression spring and may be configured to exert a linear force.

Referring to the front view 504, the first member 140 may include a contact cap 544. The contact cap 544 is configured to couple to or to contact the mechanical linkage 150. The contact cap 544 may be configured to mate with a contact portion of the mechanical linkage 150, as described with reference to FIG. 8. The front view 504 illustrates a first force 540 generated by the first member 140 (and the actuation device 134) and a second force 550 generated by the mechanical linkage 150 and spring 160. As illustrated in FIG. 5, the first force 540 has a downward direction and the second force 550 has an upward direction. Additionally, when the first member 140 includes the spring 546, the spring 546 exerts a third force 560 in the same direction as the second force 550. The first force 540 is greater than the second force 550 and the third force 560 when the actuation device 134 (not shown) is in the first position. The second force 550 is generated by the spring 160 rotating (e.g., providing torque or a bending moment to) the mechanical linkage 150.

FIG. 6 is a diagram 600 that illustrates isometric views of operation of the example of the system 100. FIG. 6 includes a first view 602 of the system 100 where the flag doors 380 are closed and the first member is in a first position 622, and includes a second view 604 of the system 100 where the flag doors 380 are open and the first member is in a second position 624. Referring to the second view 604, the mechanical linkage 150 has rotated the second door 170 in a first direction 612 (e.g., counter-clockwise as illustrated in FIG. 6) and has rotated the third door 370 in a second direction (e.g., clockwise as illustrated in FIG. 6) to open the flag doors 380. In other implementations, the second door 170 and the third door 370 are rotated in the same direction. The mechanical linkage 150 may close the flag doors 380 by reversing the rotation. To illustrate, the mechanical linkage 150 may rotate the second door 170 in the second direction 614 (e.g., clockwise as illustrated in FIG. 6) and may rotate the third door 370 in the first direction 612 (e.g., counter-clockwise as illustrated in FIG. 6) to close the flag doors 380. As illustrated in FIG. 6, the mechanical linkage 150 rotates in the first direction 612 to open the flag doors 380 and rotates in the second direction 614 to close the flag doors 380.

Figure 7:
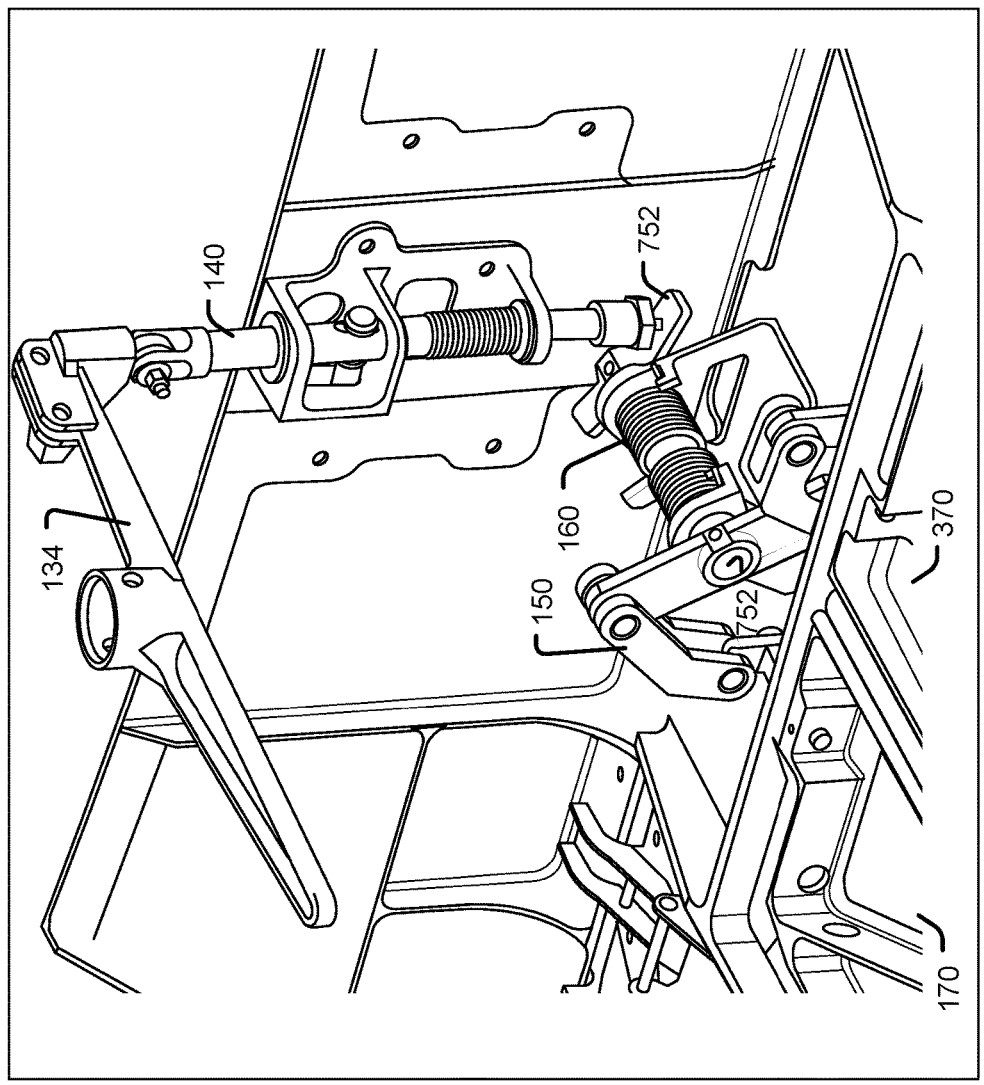
FIG. 7 is a diagram that illustrates a detailed view of the system for operating a flag door.

FIG. 7 is a diagram 700 that illustrates a detailed view of a portion of the system 100 for operating a flag door. As illustrated in FIG. 7, the mechanical linkage 150 includes a rotatable arm 752 coupled to the flag doors 380 and the actuation device 134. The rotatable arm 752 is coupled to the actuation device 134 via the first member 140. The rotatable arm 752 may be coupled to the second door 170 and the third door 370 directly or via one or more links (or members). As illustrated in FIG. 7, the rotatable arm 752 is coupled to the second door 170 via a first subset of a plurality of links and is coupled to the third door 370 via a second subset of the plurality of links. The spring 160 is disposed around the rotatable arm 752. Configurations of the mechanical linkage 150 are described further with reference to FIG. 8.

Figure 8:
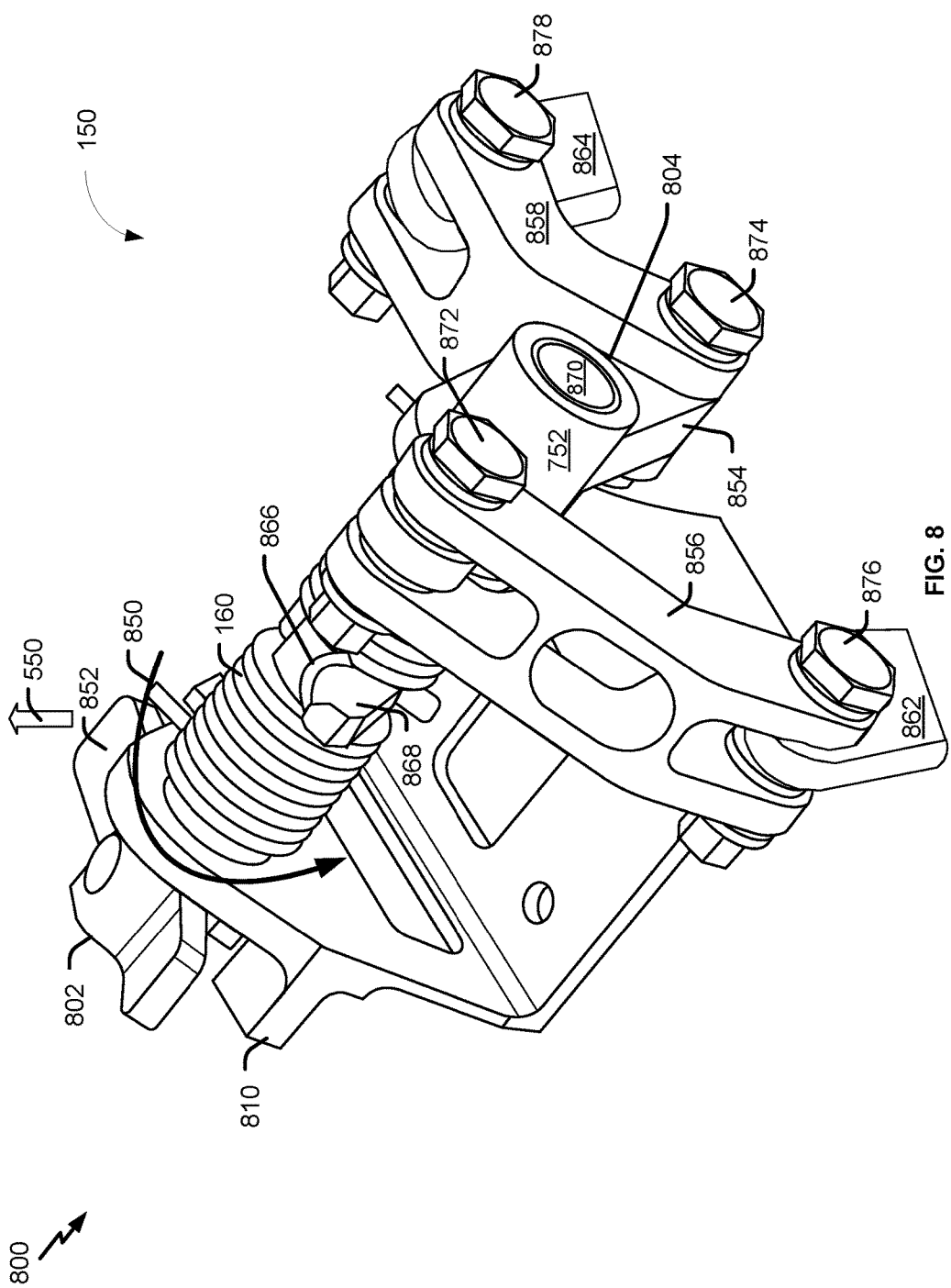
FIG. 8 is a diagram that illustrates a detailed view of the mechanical linkage of the system for operating a flag door.

FIG. 8 is a diagram 800 that illustrates a detailed view of the mechanical linkage 150 of the system 100 for operating a flag door. The mechanical linkage 150 includes the rotatable arm 752 and one or more members (e.g., links) configured to drive the flag doors. The rotatable arm 752 includes a first end 802 and a second end 804. The first end 802 of the rotatable arm 752 includes a contact 852 (e.g., a contact portion) that is configured to be coupled (e.g., operably coupled) to the first member 140 (not shown in FIG. 8). To illustrate, the contact 852 is configured to contact the second end 208 of the first member 140, such as the contact cap 544 of FIG. 5 of the first member 140. The second end 804 of the rotatable arm 752 is coupled to the flag doors 380 via the one or more members.

The mechanical linkage 150 is coupled to the second frame 306 via a bracket 810. As illustrated in FIG. 8, the rotatable arm 752 runs through the bracket 810 and the spring 160 is disposed around the rotatable arm 752. The bracket 810 may function as a housing (e.g., a spring retainer) for the spring 160. Additionally or alternatively, one or more spring spacers or spring retainers may be used to hold the spring 160 in place. The spring 160 may include a looped portion 866 that contacts or abuts a bias member or pin 868 of the rotatable arm 752. The bias member or pin 868 provides a contact for the looped portion 866 of the spring 160 to provide force and bias (e.g., rotate) the rotatable arm 752. To illustrate, the spring 160 exerts force against the rotatable arm 752 to provide the second force 550 to the first member 140 (not shown) and to provide a fourth force 850 to the flag doors 380 (not shown) via the mechanical linkage 150. As illustrated in FIG. 8, the fourth force 850 is rotational counter-clockwise force which drives (e.g., rotates) the input link 854 of the mechanical linkage 150.

As illustrated in FIG. 8, the mechanical linkage 150 includes the input link 854, a first coupler link 856, and a second coupler link 858, a first output link 862, and a second output link 864. The input link 854 is coupled (e.g., rotatably coupled) to the second end 804 of the rotatable arm 752. As illustrated in FIG. 8, an intermediate (e.g., middle) portion of the input link 854 is coupled to the second end 804 of the rotatable arm 752 via a pin forming a first rotatable joint 870 (e.g., a revolute joint). The input link 854 is coupled to the first coupler link 856 and the second coupler link 858. As illustrated in FIG. 8, one end of the input link 854 is coupled to the first coupler link 856 via a bolt, and another end of the input link 854 is coupled to the second coupler link 858 via a bolt. The input link 854, the first coupler link 856, and the second coupler link 858 form two rotatable joints: a second rotatable joint 872 and a third rotatable joint 874. The first coupler link 856 is coupled to the first output link 862 via a bolt forming a fourth rotatable joint 876. The first output link 862 is coupled to the second door 170. The second coupler link 858 is coupled to the second output link 864 via bolt forming a fifth rotatable joint 878. The second output link 864 is coupled to the third door 370.

The mechanical linkage 150 may include or correspond to two four-bar linkages. To illustrate, the input link 854, the first coupler link 856, the first output link 862, and the second frame 306 (e.g., ground) correspond to a first four-bar linkage to drive the second door 170. The input link 854, the second coupler link 858, the second output link 864, and the second frame 306 (e.g., ground) correspond to a second four-bar linkage to drive the third door 370. In such implementations, the coupler links 856, 858 may correspond to floating links, and the input link 854 and the output links 862, 864 may correspond to grounded links.

The links or members of the mechanical linkage 150 may be coupled together by fasteners, such as pins or shoulder bolts, as illustrative, non-limiting examples, to form the rotatable joints (e.g., revolute joints). Each four-bar linkage may be associated with four rotatable joints. To illustrate, the first four-bar linkage corresponds to the rotatable joints 870, 872, 876 and a rotatable joint formed by the first output link 862 and the second door 170, and the second four-bar linkage corresponds to the rotatable joints 870, 874, 878 and a rotatable joint (not shown) formed by the second output link 864 and the third door 370.

In other implementations, other linkages may be used, such as five-bar linkages, six-bar linkages, etc. Although two flag doors are illustrated in FIG. 3, more than the two flag doors or fewer than two flag doors may be used. In such implementations where a single flag door is used, such as the second door 170, the mechanical linkage 150 may be directly connected to the second door 170. To illustrate, the rotatable arm 752 may be coupled to the second door 170. Although various linkages (members) have been described, the mechanical linkage 150 may include one or more gears.

Figure 9:
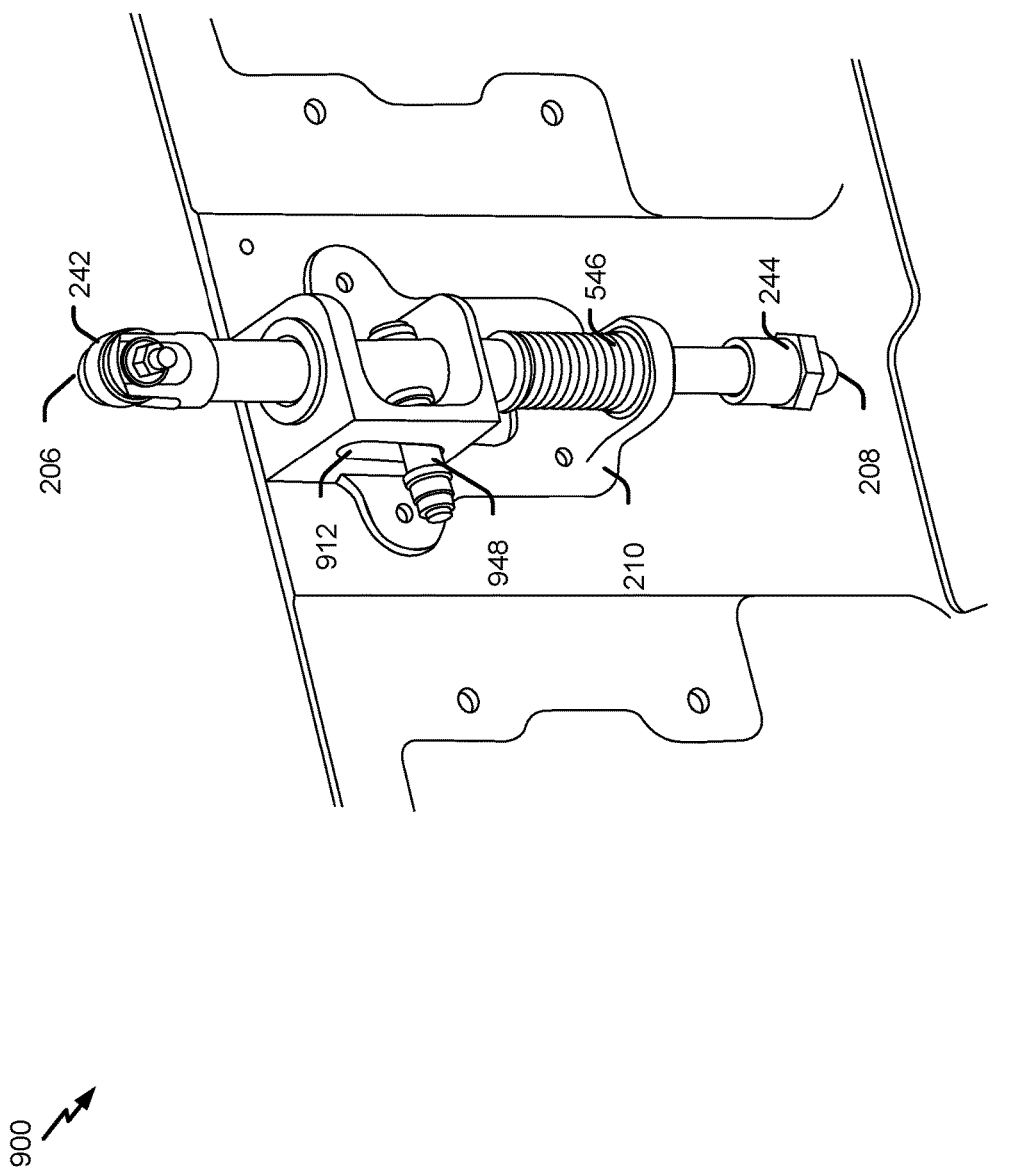
FIG. 9 is a diagram that illustrates a detailed view of the first member of the system for operating a flag door.

FIG. 9 is a diagram that illustrates a detailed view of the first member 140 of the system for operating a flag door. As illustrated in FIG. 9, the first member 140 is included in a bracket 210 (e.g., a housing) coupled to the first frame 304. The first member 140 may move between the first position and the second position within the bracket 210. The bracket 210 may include an opening 912 (e.g., a guide slot) for a guide pin 948 of the first member 140. The guide pin 948 is configured to move within (e.g., be restrained by) the opening 912. The opening 912 and the guide pin 948 may control (e.g., limit or restrict) the movement of the first member 140. To illustrate, the first position of the first member 140 may correspond to a lower limit of the opening 912 and the guide pin 948 and the second position may correspond to an upper limit of the opening 912 and the guide pin 948. The first member 140 may include the spring 546 configured to bias the first member 140 towards the second position.

Figure 10:
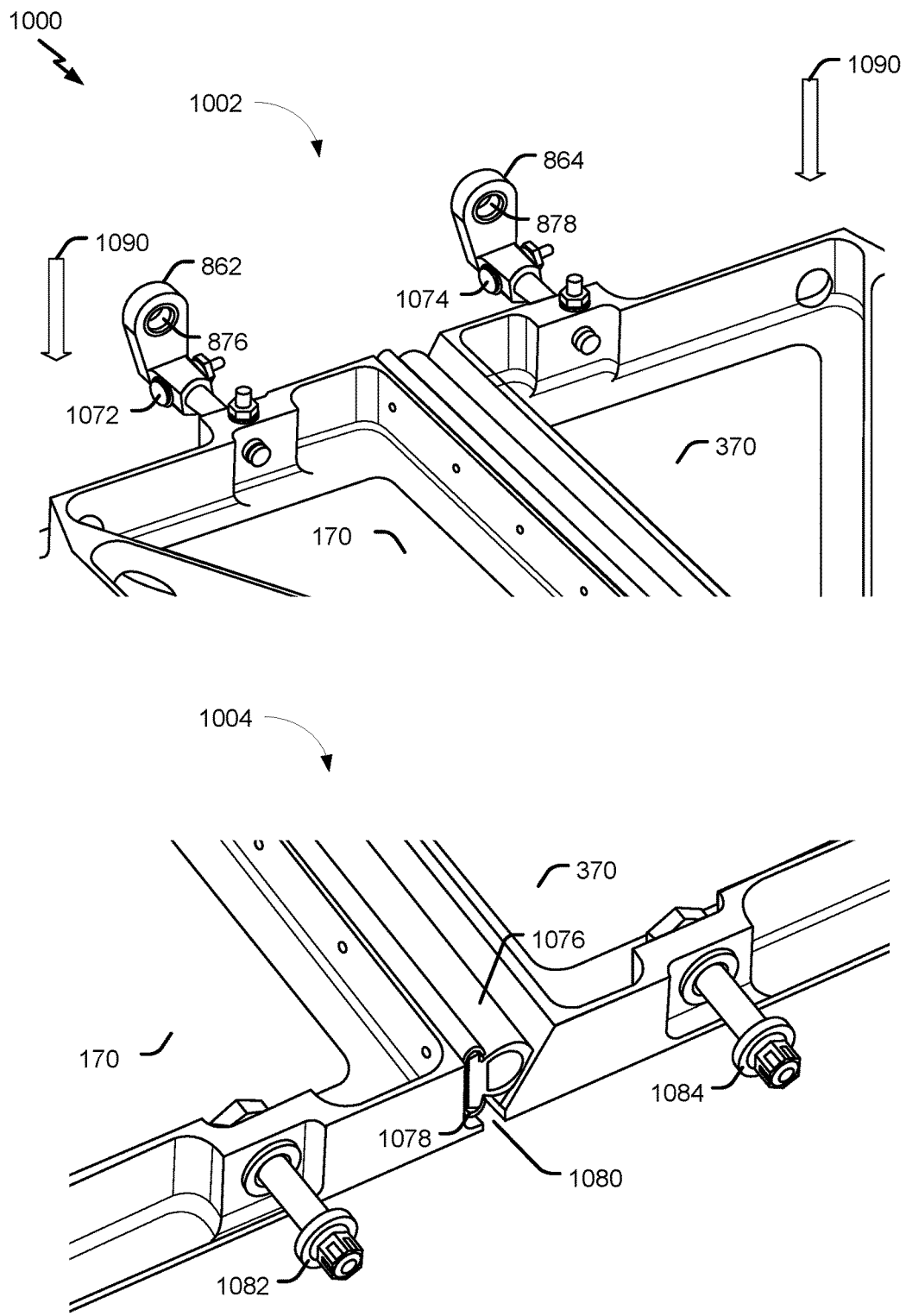
FIG. 10 is a diagram that illustrates a detailed view of the flag doors of the system for operating a flag door.

FIG. 10 is a diagram 1000 that illustrates a detailed view of the flag doors of the system for operating a flag door. The diagram 1000 includes a first view 1002 of a fore portion of the flag doors 380 and a second view 1004 of an aft portion of the flag doors 380. Referring to the first view 1002, the flag doors 380 are coupled to output links 862, 864 of the mechanical linkage 150 and form rotatable joints 1072, 1074. To illustrate, the second door 170 is coupled to a first output link 862, which is coupled to the first coupler link 856 of FIG. 8 (not shown), to form a sixth rotatable joint 1072. The third door 370 is coupled to a second output link 864, which is coupled to the second coupler link 858 of FIG. 8, to form a seventh rotatable joint 1074. Rotation of the output links 862, 864 rotates the second door 170 in the first direction and the third door 370 in the second direction to open the flag doors 380, as described with reference to FIG. 6.

As illustrated in the first view 1002 of FIG. 10, a pressure differential force 1090 caused by a pressure differential, such as a pressure differential between the non-pressure-controlled region 114 and the exterior 190, is exerted on the flag doors 380. For example, because the flag doors 170, 370 are coupled to the output links 362 closer to one side than another side of each door 170, 370, the pressure differential causes the pressure differential force 1090 to be greater on the other side of each door 170, 370. As illustrated in the first view 1002, the second door 170 and the third door 370 are coupled to the output links 862, 864 closer to an inside of each door 170, 370 and the outside of each door 170, 370 experiences the pressure differential force 1090. Accordingly, as illustrated in FIG. 10, the pressure differential force 1090 causes or assists the second door 170 in rotating counter-clockwise and the third door 370 in rotating clockwise to open.

Referring to the second view 1004, the flag doors 380 may include a seal 1076 and a seal retainer 1078 configured to hold or secure the seal 1076. The seal 1076 is configured to cover or seal a gap 1080 between the second door 170 and the third door 370 of the flag doors 380. The flag doors 380 are coupled to the second frame 306 (not shown) via pins or bolts 1082, 1084. For example, the flag doors 380 may be coupled to a bushing (not shown) of the second frame 306. As illustrated in the second view 1004, the second door 170 is coupled to the second frame 306 via a first pin or bolt 1082, and the third door 370 is coupled to the second frame 306 via a second pin or bolt 1084. The pins or bolts 1082, 1084 are rotatable and allow the flag doors 380 to pivot relative to the second frame 306, as described with reference to FIG. 6. In some implementations, the pins or bolts 1082, 1084 include or correspond to shoulder bolts.

As compared to flag door systems that use overlapping doors separated by a gasket, the system 100 reduces impingement of the flag doors 380 as the flag doors 380 are separated by the gap 1080 which includes the seal 1076. Additionally, as compared to flag door systems that use triggered torsion springs to open flag doors, the system 100 may not use rotation stop hardware.

Figure 11:
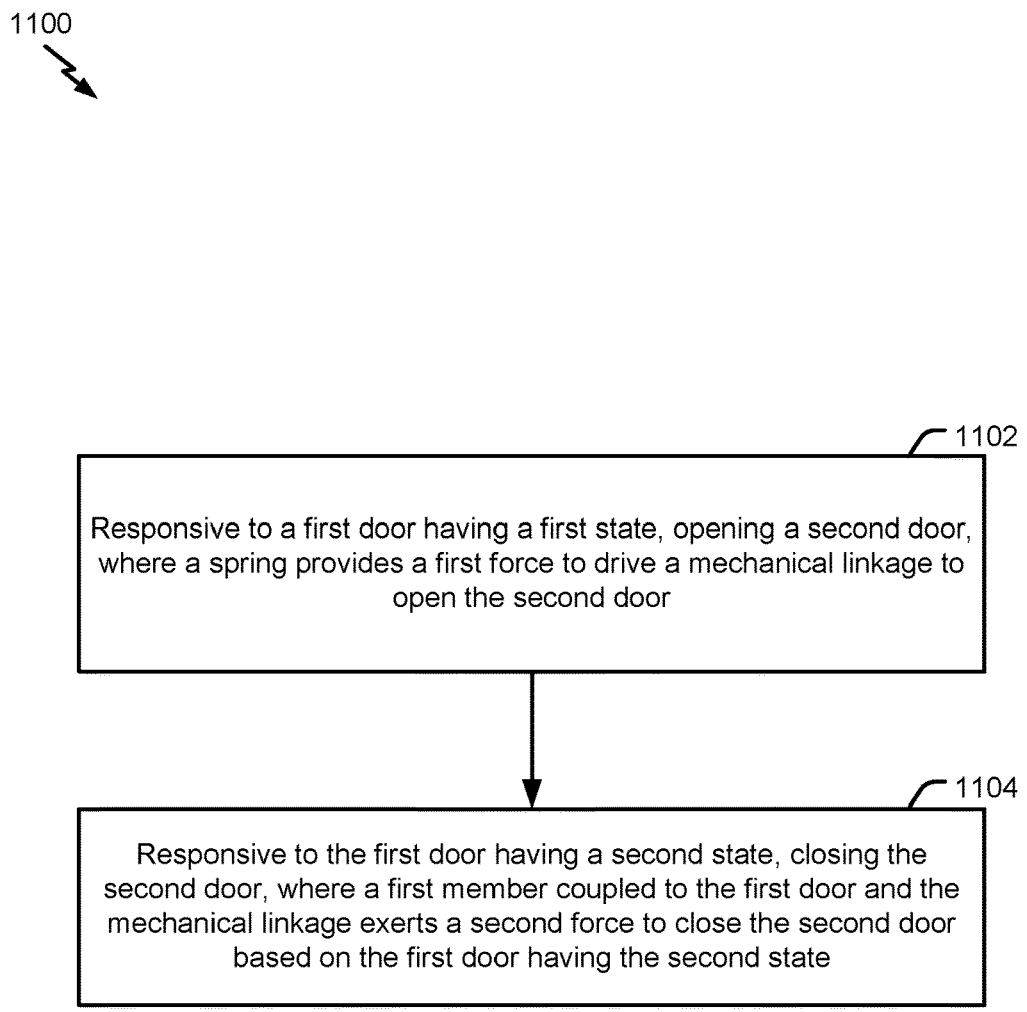
FIG. 11 is a flow chart of an example of a method of operating a flag door.

FIG. 11 illustrates a method 1100 of operating a flag door. The method 1100 may be performed by the system 100 of FIG. 1 or the vehicle 102 of FIG. 1. The method 1100 includes, at 1102, responsive to a first door being in a first state, opening a second door, where a spring provides a first force to drive a mechanical linkage to open the second door. The first door may include or correspond to the first door assembly 130, the first door 132, or both, and the second door may include or correspond to the second door 170, the third door 370, or the flag doors 380. The spring may include or correspond to the spring 160 of FIG. 1, and the mechanical linkage may include or correspond to the mechanical linkage 150 of FIG. 1. The first force may include or correspond to the second force 550 of FIG. 5, the fourth force 850 of FIG. 8, or a combination thereof.

The method 1100 of FIG. 11 further includes, at 1104, responsive to the first door being in a second state, closing the second door, where a first member coupled to the first door and the mechanical linkage exerts a second force to close the second door based on the first door being in the second state. The first member may include or correspond to the first member 140 of FIG. 1. As described above, transitioning from the first state to the second state drives the mechanical linkage to open a flag door. The second force may include or correspond to the first force 540 of FIG. 5.

In some implementations, the method 1100 further includes, responsive to the first door being in the first state opening a third door. The first state may correspond to an unlatched state or a partially latched state, and the second state corresponds to a latched state. In some implementations, the method 1100 further includes opening the second door in response to a pressure differential between regions separated by the second door exceeding a pressure differential threshold.

In some implementations, the method 1100 further includes opening the second door a second time in response to the pressure differential between the regions separated by the second door exceeding the pressure differential threshold when the first door is in the first state, where the pressure differential provides a third force to drive the mechanical linkage to open the second door. The third force may include or correspond to the pressure differential force 1090 of FIG. 10. In a particular implementation, the spring does not provide the first force to drive the mechanical linkage to open the second door the second time. In such implementations, the spring may have failed or degraded.

In some implementations, the first member comprises a pushrod and exerts the second force to close the second door when the first door is in the second state, and the second force is greater than the first force. In some implementations, the spring exerts the first force independent of a state of the first door. The spring opens the second door based on a position of the pushrod, and the position of the pushrod is based on the state of the first door.

Figure 12:
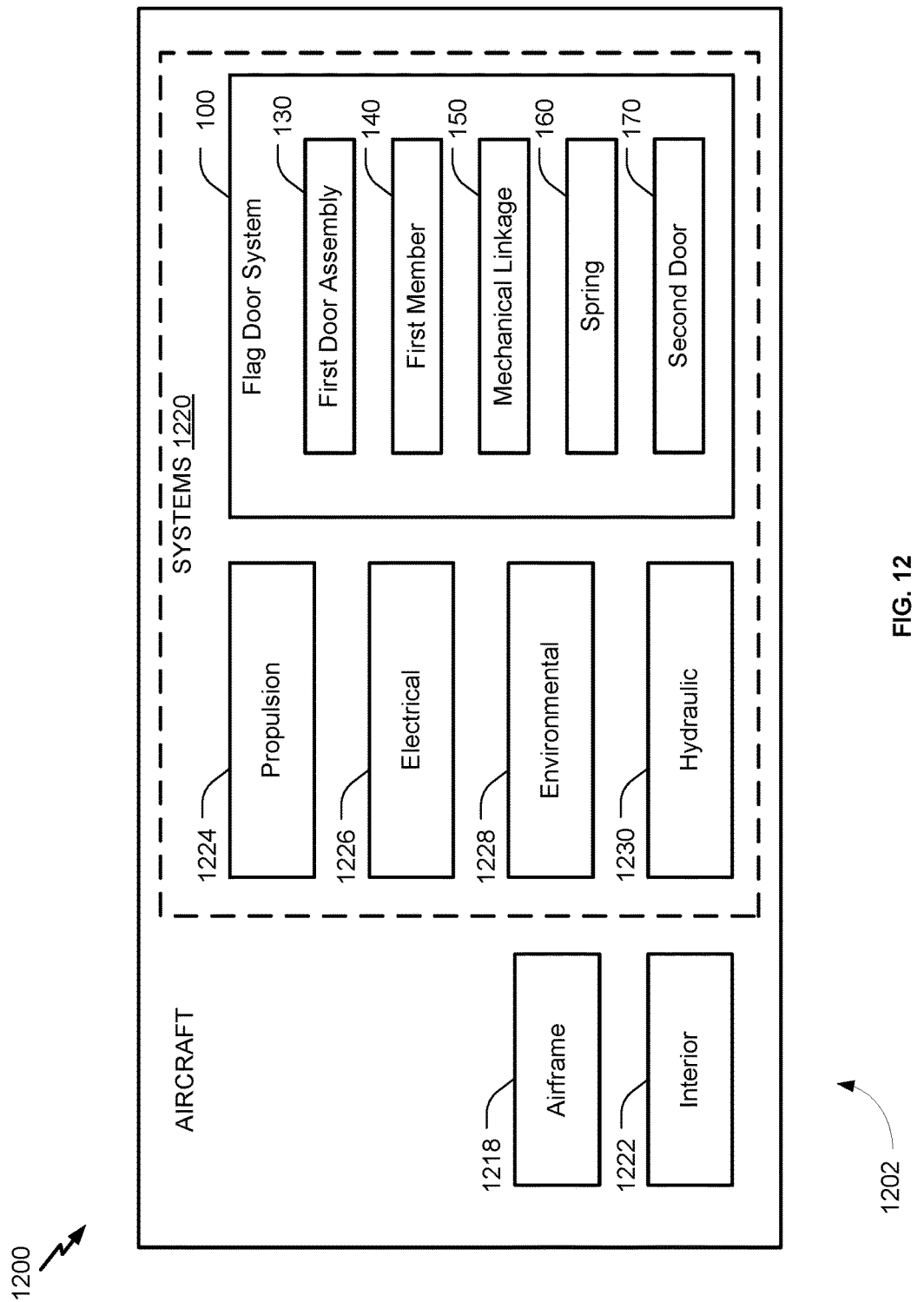
FIG. 12 is a block diagram of an illustrative implementation of an aircraft including a system for operating a flag door.

Referring to FIG. 12, a block diagram of an illustrative embodiment of an aircraft 1202 (e.g., an airplane or a drone) is shown and designated 1200. The aircraft 1202 may include or correspond to the vehicle 102 of FIG. 1. As shown in FIG. 12, the aircraft 1202 may include an airframe 1218, an interior 1222, and a plurality of systems 1220. The systems 1220 may include one or more of a propulsion system 1224, an electrical system 1226, a hydraulic system 1230, an environmental system 1228, and the system 100 (e.g., a flag door system). Any number of other systems may be included. The flag door system 100 includes the first door assembly 130, the first member 140, the mechanical linkage 150, the spring 160, and the second door 170 of FIG. 1. The flag door system 100 may be configured to open the second door 170 based on a pressure differential and/or a state of the first door 132, as described above with reference to FIGS. 1-11.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
   a first structure between a pressure-controlled region of the aircraft and a non-pressure-controlled region of the aircraft;
   a second structure between the non-pressure-controlled region and an exterior of the aircraft;
   a first door assembly, including a first door configured to cover a first opening between the pressure-controlled region and the non-pressure-controlled region;
   a second door configured to cover a second opening between the non-pressure-controlled region and the exterior; and
   a spring coupled, via a first member, to the first door assembly and coupled, via a mechanical linkage, to the second door, the spring configured to apply a first force to the first member and to apply a second force, via the mechanical linkage, to the second door, wherein the second force is applied based on a state of the first door assembly.

2. The aircraft of claim 1, wherein the mechanical linkage comprises:
   a rotatable arm including a first end and a second end, wherein the first member is coupled to the first end of the rotatable arm; and
   a four-bar linkage coupled between the second end of the rotatable arm and the second door.

3. The aircraft of claim 2, wherein the spring is disposed around of the rotatable arm and configured to apply the second force on the second door to open the second door when the first member is in a second position.

4. The aircraft of claim 3, wherein the first force is less than a third force exerted by the first member when the first member is in a first position.

5. The aircraft of claim 1, wherein the first member includes a pushrod operably coupled to the first door assembly, the pushrod disposed in a first position when the first door assembly is in a first state and disposed in a second position when the first door assembly is in a second state.

6. The aircraft of claim 5, further comprising an actuation device of the first door assembly coupled to the mechanical linkage via the pushrod, wherein the first state corresponds to a latched state of the first door assembly, and wherein the second state corresponds to an unlatched state or a partially latched state of the first door assembly.

7. The aircraft of claim 6, wherein the actuation device comprises a latch or a handle of the first door assembly, and wherein the pushrod is operably coupled to the latch or the handle.

8. The aircraft of claim 1, further comprising a third door configured to cover a third opening between the non-pressure-controlled region and the exterior, the mechanical linkage configured to open the second door and the third door when the first member is in a second position.

9. The aircraft of claim 8, wherein the second door rotates in a first direction and the third door rotates in a second direction.

10. The aircraft of claim 1, wherein the non-pressure-controlled region is a cavity of a fairing of the aircraft, and wherein the second door is configured to open in response to a pressure differential between the non-pressure-controlled region and an ambient pressure exceeding a pressure differential threshold.

11. A device comprising:
    a spring configured to bias a door in an open position; and
    mechanical linkage coupled to the spring, the door, and to a first member, wherein the spring is configured to drive the mechanical linkage to open the door responsive to a position of the first member, wherein the mechanical linkage includes a rotatable arm, and wherein the spring is coiled around the rotatable arm.

12. The device of claim 11, wherein the first member is coupled to a first end of the rotatable arm, and wherein a four-bar linkage is coupled between a second end of the rotatable arm and a second door.

13. The device of claim 11, wherein the first member comprises a pushrod, wherein the rotatable arm is coupled to an actuation device of an access door via the pushrod, and wherein the position of the pushrod is based on a state of the actuation device of the access door.

14. The device of claim 11, wherein the mechanical linkage includes:
    an input link coupled to the rotatable arm;
    an output link coupled to the door; and
    a coupler link coupled to the input link and the output link.

15. The device of claim 14, wherein the input link, the output link, the couple link, and a frame comprise a four-bar linkage, wherein the mechanical linkage is further coupled to a third door, and wherein the mechanical linkage includes a second four-bar linkage configured to open the third door.

16. A method comprising:
    responsive to a first door being in a first state, opening a second door, wherein a spring provides a first force to drive a mechanical linkage to open the second door; and
    responsive to the first door being in a second state, closing the second door, wherein a first member coupled to the first door and the mechanical linkage exerts a second force to close the second door based on the first door being in the second state.

17. The method of claim 16, further comprising, responsive to the first door being in the first state opening a third door, wherein the first state corresponds to an unlatched state or a partially latched state, and wherein the second state corresponds to a latched state.

18. The method of claim 16, further comprising opening the second door a second time in response to a pressure differential between regions separated by the second door exceeding a pressure differential threshold when the first door is in the first state, wherein the pressure differential provides a third force to drive the mechanical linkage to open the second door.

19. The method of claim 16, wherein the first member comprises a pushrod and exerts the second force to close the second door when the first door is in the second state, and wherein the second force is greater than the first force.

20. The method of claim 19, wherein the spring exerts the first force independent of a state of the first door, wherein the spring opens the second door based on a position of the pushrod, and wherein the position of the pushrod is based on the state of the first door.

* * * * *